Jan. 2, 1962  W. B. EDMONDSON  3,015,613
SOLAR WATER STILL
Filed Aug. 4, 1954
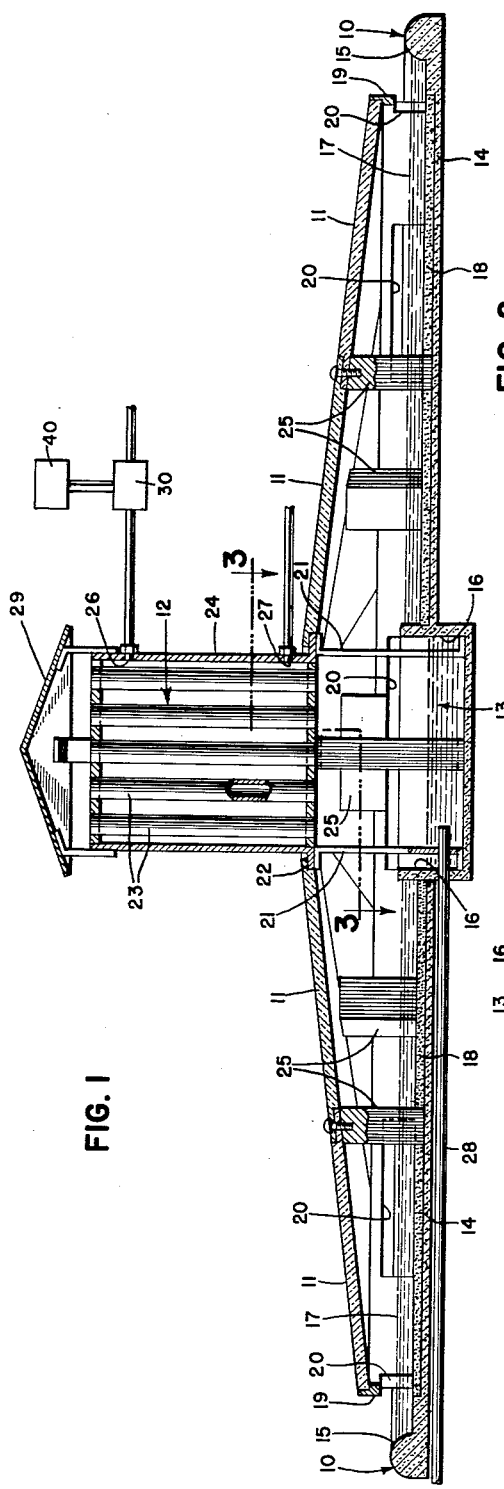
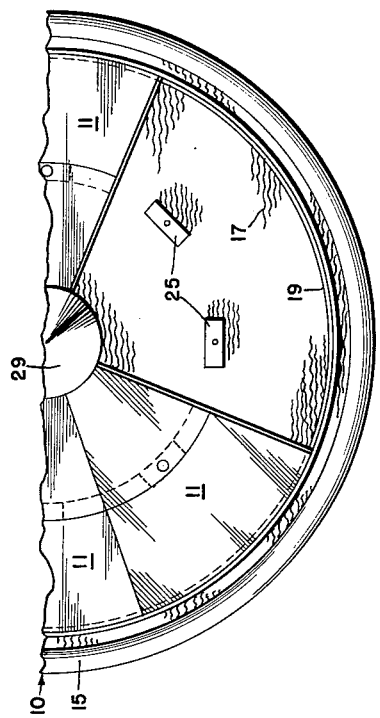
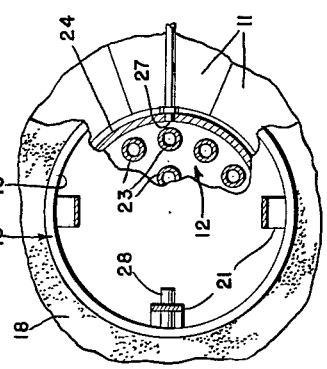
INVENTOR
WILLIAM B. EDMONDSON

United States Patent Office 3,015,613
Patented Jan. 2, 1962

3,015,613
SOLAR WATER STILL
William B. Edmondson, 1502 N. Lincoln St., Santa Ana, Calif.
Filed Aug. 4, 1954, Ser. No. 447,940
5 Claims. (Cl. 202—187)
(Granted under Title 35, U.S. Code (1952), sec. 266)

The invention descried herein may be manufactured and used by or for the Government of the United States for governmental purposes without the payment of any royalties thereon or therefor.

This invention relates to a solar water still which utilizes the heat of solar radiation to introduce a liquid into the air by evaporation and which subsequently condenses said liquid.

A solar water still capable of efficient operation with production of large quantities of fresh water from salt water has become a vital need in view of the insufficiency of conventional fresh water sources to provide highly populated areas with the minimum amount necessary for daily activities.

Solar water stills of this general type have been constructed to convert salt water to fresh water. These stills, however, have the disadvantage of not being capable of producing large quantities of condensate in an efficient manner, since no provision was made to hasten and localize condensation of the water vapor. Another disadvantage of the previous stills is that they do not utilize the force created by the moving air masses to do useful work. A further disadvantage of the prior art solar stills is that no provision was made for the recovery of the valuable distillation products remaining after evaporation of the liquid therefrom.

The present invention overcomes the attendant defects of the prior art solar stills by a unique structure which is designed so as to take advantage of the air forces naturally created in the distillation process, and which produces large quantities of condensate by an effective condenser arrangement. The apparatus affords a means to recover the distillation products by conventional pumps in that the surface pool of liquid to be condensed is easily accessible under the roof of the still.

An object of the present invention is to provide a solar still which by its peculiar structure furnishes a rapid condensation of moisture laden air in an effective manner.

Another object of the present invention is the provision of a solar still construction which exposes a maximum of liquid surface area per unit volume of liquid to be heated and evaporated by radiant heat energy of the sun.

It is a further object of the present invention to provide a solar still which may be utilized as a wind power source.

A final object of the present invention is the provision of an apparatus which is economical in distilling large volumes of salt water to fresh water.

Other objects and many of the attendant advantages of this invention will be readily appreciated as the same becomes better understood by reference to the following detailed description when considered in connection with the accompanying drawings wherein:

FIG. 1 is a longitudinal cross section of the front view of a preferred embodiment of the invention;

FIG. 2 illustrates the top view of the apparatus shown in FIG. 1;

FIG. 3 is a sectional view taken on the line 3—3 of FIG. 1.

Referring now to the drawings, wherein like reference characters designate like or corresponding parts throughout the several views, there is shown in FIG. 1 a base 10, a transparent roof 11 covering base 10, a condenser 12, and a catch basin 13.

The base 10 is composed of a waterproof layer 14 generally circular in shape, and bounded on the periphery thereof by a waterproof wall 15. Integrally connected to layer 14 and at the center thereof is located a waterproof catch basin 13. The side 16 of catch basin 13, layer 14, and wall 15 form a receptacle for the liquid 17 which is to be distilled.

For purposes of illustration FIG. 1 shows a coating 18 of heat absorbing material, such as black sand, intermediate of layer 14 and liquid 17 to absorb the heat rays of the sun. The coating 18 may be eliminated by composing layer 14 of substance having heat absorbing properties without departing from the scope of this invention.

A sloping transparent roof 11 converges upwardly toward the centrally located condenser 12 spaced above catch basin 13. The periphery of roof 11 is supported above base 10 by support member 19 positioned inwardly of wall 15. Spaced openings 20 in support member 19 allow air to enter under roof 11. Additional support for roof 11 is obtained through the use of radially spaced uprights 21 mounted on base 10. The center of roof 11 is supported on the lower flange member 22 of condenser 12.

Condenser 12 extends upwardly through the center of roof 11 and comprises spaced-apart condenser tubes 23 surrounded by outer jacket 24 as shown in FIG. 3. Supports 25 anchored to catch basin 13 fix condenser 12 in position. A coolant for condenser 12 enters opening 26 and after heat exchange exits through opening 27 in jacket 24.

Directly below condenser 12 is catch basin 13 which captures the condensate from condenser 12, and conduit 28 leading from the catch basin 13 carries the condensate therefrom to a storage or distributing point removed from the solar still. Catch-basin side 16 extends above the surface of layer 14 to serve as a dam for liquid 17, and below the layer 14 to provide access thereto by conduit 28 as well as to increase the volume of the catch-basin.

The operation of the solar still comprising this invention is as follows:

A thin layer of the liquid to be distilled is flooded over absorption coating 18. By action of the radiant heat energy of the sun rays penetrating through transparent roof 11 and absorbed by coating 18, the liquid 17 is heated and evaporated into the air entering from the atmosphere through openings 20. The hot moisture-laden air is forced upwardly and inwardly under roof 11 by convection currents and then through condenser 12. The updraft of hot moisture laden air loses its moisture in passing through condenser 12, and the condensate falls from condenser 12 into catch-basin 13 located directly below.

The large volume of air rushing through condenser to be expelled under condenser covering 29 to the atmosphere would create an appreciable wind force which may be harnessed by well known wind driven devices such as 40. This power could be utilized, for example, to operate power pumps such as 30 for the circulation of the condenser coolant to make the device more economically feasible.

The distillation products remaining in liquid 17 after evaporation occurs are removed by suitable pumping means introduced under roof 11 through spaced openings 20, and a new liquid to be distilled is subsequently provided.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. A circular solar still comprising, in combination, a base, said base being adapted to hold a liquid pool to be evaporated, a conical type roof permeable to solar radiation covering said base and supported thereby, means for admitting air substantially uniformly about the periphery of the still to the space underneath said roof, a vertical tubed condenser centrally positioned on and attached to said roof at the apex of the roof, said roof sloping upwardly to said condenser, and a catch basin below and vertically aligned with the said condenser and connected to said base to receive the condensate from said condenser.

2. A circular solar still comprising, in combination, a flat circular base, a conical type roof permeable to solar radiation covering said base and supported thereby, means for admitting air substantially uniformly about the periphery of the still to the space underneath said roof, a vertical tubed condenser centrally positioned with respect to and attached to said roof at the apex of the roof, said roof sloping upward to said condenser, a catch basin below and vertically aligned with the said condenser and connected to said base, a removable heat absorbing comminuted waterproof material forming a bed on said base, said bed being bounded by an outer peripheral waterproof wall on said base and by an inner concentrically located waterproof wall, said inner wall forming sides for said catch basin.

3. A solar still comprising, in combination, a base for holding a liquid pool to be evaporated, an inwardly and upwardly sloping conical roof permeable to solar radiation and supported by said base, a vertical tubed condensed positioned centrally of said conical roof and extending above and below said roof, and means below said condenser to receive the condensate from said condenser.

4. A circular solar still comprising, in combination, a base for holding a liquid pool to be evaporated, a conical type roof permeable to solar radiation covering said base and supported thereabove, a vertical tubed condenser centrally positioned with respect to and attached to said roof at the apex of the roof, said roof sloping upwardly from said base to said condenser, a catch basin beneath and aligned with said condenser connected to said base and extending above and below thereof, and a peripheral roof support mounted on said base having openings positioned below the roof and about the periphery of the still therein to admit air currents substantially uniformly about the periphery of the still.

5. A circular solar still comprising, in combination, a base for holding a liquid pool to be evaporated, said base being composed of a waterproof material, a removable bed of heat absorbing comminuted waterproof material on said base bounded by an outer peripheral waterproof wall connected to said base, and by an inner concentrically located waterproof wall connected to said base, a conical type roof permeable to solar radiation covering said base and supported thereabove, a vertical tubed condenser centrally positioned with respect to and attached to said roof at the apex of the roof, said roof sloping upwardly from said base to said condenser, a catch basin beneath said condenser connected to said base, said inner wall forming sides for the catch basin, and a peripheral roof support mounted on said base having openings therein to admit air currents substantially uniformly about the periphery of the still.

References Cited in the file of this patent

UNITED STATES PATENTS

| | | |
|---|---|---|
| 983,424 | Brosius | Feb. 7, 1911 |
| 1,544,029 | Nelson | June 30, 1925 |
| 2,636,129 | Agnew | Apr. 21, 1953 |

FOREIGN PATENTS

| | | |
|---|---|---|
| 28,130 | Great Britain | Dec. 30, 1907 |
| 37,903 | France | Nov. 29, 1930 |
| 820,705 | France | Aug. 9, 1937 |

OTHER REFERENCES

"Fresh Water from the Ocean," by C. B. Ellis (Ronald Press, 1954), pp. 160–168.

"Second Annual Report of the Sec'y of the Interior on Saline Water Conversion" (January 1954), pp. 31–34, 42 and 43.